US007933812B2

(12) United States Patent
Truong et al.

(10) Patent No.: US 7,933,812 B2
(45) Date of Patent: Apr. 26, 2011

(54) SYSTEM INTEGRATOR AND COMMODITY ROLL-UP

(75) Inventors: Yen Truong, Brentwood (GB); Andy Moir, Chelmsford (GB); Jill Forbis, Commerce Township, MI (US); Laura Wagner, Dearborn, MI (US); Ron Cirihal, Commerce Township, MI (US)

(73) Assignee: Ford Motor Company, Dearborn, MI (US)

( * ) Notice: Subject to any disclaimer, the term of this patent is extended or adjusted under 35 U.S.C. 154(b) by 1757 days.

(21) Appl. No.: 10/905,209

(22) Filed: Dec. 21, 2004

(65) Prior Publication Data

US 2006/0136302 A1    Jun. 22, 2006

(51) Int. Cl.
*G06Q 30/00* (2006.01)
(52) U.S. Cl. ............... 705/26.8; 705/7; 705/10; 705/26; 705/27; 705/37; 705/28; 707/1
(58) Field of Classification Search ............... 705/7, 26, 705/27, 28, 37, 26.8, 10; 707/1
See application file for complete search history.

(56) References Cited

U.S. PATENT DOCUMENTS

| | | | |
|---|---|---|---|
| 5,666,493 A | 9/1997 | Wojcik et al. | |
| 5,758,329 A | 5/1998 | Wojcik et al. | |
| 6,055,519 A | 4/2000 | Kennedy et al. | |
| 2002/0019780 A1 | 2/2002 | Herman | |
| 2002/0052862 A1* | 5/2002 | Scott et al. ........................ 707/1 |
| 2002/0065764 A1* | 5/2002 | Brodersen et al. .............. 705/37 |
| 2002/0069096 A1 | 6/2002 | Lindoerfer et al. | |
| 2002/0147622 A1 | 10/2002 | Drolet et al. | |
| 2002/0188530 A1 | 12/2002 | Wojcik et al. | |
| 2003/0014314 A1 | 1/2003 | Griep et al. | |
| 2003/0110054 A1 | 6/2003 | Lindquist | |
| 2003/0126000 A1* | 7/2003 | Clendenin ........................ 705/7 |
| 2003/0200150 A1 | 10/2003 | Westcott et al. | |
| 2003/0225637 A1* | 12/2003 | Pemberton et al. ............. 705/28 |
| 2003/0236718 A1 | 12/2003 | Yang et al. | |
| 2004/0030602 A1 | 2/2004 | Rosenquist et al. | |
| 2004/0030724 A1 | 2/2004 | Rosenquist et al. | |
| 2004/0054603 A1 | 3/2004 | Clinesmith et al. | |
| 2008/0052149 A1* | 2/2008 | Fischer et al. ................... 705/10 |

OTHER PUBLICATIONS

"Motorcity shakeup"; Christopher Koch. Darwin. Framington: Jan. 2002. vol. 2, Iss. 1; p. 46, 6 pgs extracted from Proquest on Apr. 1, 2008.*
"Supplier tiering creates purchasing pickle"; Winter, Drew. Ward's Auto World. Detroit: Jul. 1996. vol. 32, Iss. 7; p. 45, 3 pgs extracted from Proquest on Apr. 1, 2008.*
Best Value Blanket Purchase Agreement Federal Supply Schedule, National Oceanic and Atmospheric Administration (NOAA).
Blanket Purchase Agreement, pp. 1-5.
Article, "Vendor Managed Inventory Customers Like the Possibilities", Michele R. Lamb, Metal Center News, Feb. 1997, p. 42.
Article, "Just-in-Time Inventory Management: Implementation of a Successful Program", Ruth W. Epps, Review of Business, Fall 1995, v17, n1, p. 40(5).
Article, "C&SW Materials Management Effort Helps Supplier Ties (Central and SouthWest Corp)", Electrical Light & Power, Dec. 1991, v69, n12, p. 9(1).

* cited by examiner

*Primary Examiner* — Yogesh C Garg
(74) *Attorney, Agent, or Firm* — Raymond L. Coppiellie; Brooks Kushman P.C.

(57) ABSTRACT

A purchasing entity directs the sourcing of one or more parts in a microprocessor-based method. The microprocessor-based method comprises obtaining over a computer network sourcing information from a primary supplier which identifies one or more third party secondary suppliers for one or more parts in a group of parts, ordering the group of parts from the primary supplier, and then issuing a release to the secondary supplier to ship the part to a predetermined location. A computer system for purchasing parts from a secondary supplier that executes the method is also provided.

19 Claims, 3 Drawing Sheets

SYSTEM INTEGRATOR AND COMMODITY ROLL-UP

BACKGROUND OF THE INVENTION

1. Field of the Invention

The present invention relates to methods of integrating the purchase of components from primary and secondary suppliers such that a purchaser can direct the shipping of components from the secondary supplier.

2. Background Art

As the size and complexity of manufactured articles increases, the complexity of efficient component purchasing systems for such articles increases. Manufactured items such as automobiles include numerous sub-systems each of which include a number of components. For example, automobiles include a powertrain system, sound systems, exhaust systems, environmental control systems, computer control systems, and the like. Moreover, market and governmental pressures require the constant design and redesign of these systems. Each system includes many discrete subcomponents that are purchased from suppliers.

Experience in the purchase of automobile components has shown that it is desirable to purchase parts from only a select few suppliers that are called Tier 1 suppliers. The advantages of dealing with such a reduced number of suppliers include a reduction in accounting expenses, improved component quality, and associated reduction in component expenses. The reduction in accounting expenses is the result of having to monitor and track the performance of a smaller number of suppliers. Improved quality is the result of suppliers competing for the coveted Tier 1 status and from the experience the supplier obtains over time in having such a status. Moreover, the reduction in component costs is a direct result in the competition and experience associated with Tier 1 status.

Notwithstanding the advantages in dealing with a reduced number of suppliers, there are associated problems. Complex manufactured components often include a large number of components. Moreover, a large manufacturing company may manufacture a number of articles each of which include a number of components. Accordingly, it is not always possible to obtain every part from the suppliers.

Manufacturing companies have used various methods to deal with the inadequacies in only purchasing from Tier 1 suppliers. Such methods have typically involved participation by the manufacturing company in the purchasing of parts from Tier 2 suppliers. Tier 2 suppliers are those suppliers from which Tier 1 suppliers purchase components. For example, a Tier 1 supplier might purchase a part from a Tier 2 supplier and store it until needed by the manufacturing company. Difficulties in such a purchasing situation may be traced to the inadequacy of many purchasing systems in dealing with goods originating from non-suppliers. Some systems attempt to deal with these instances by using phantom supplier codes. Although these fixes work to some extent, these systems are still inefficient and needlessly complex.

Accordingly, there is a need in the prior art for improved purchasing systems that directly integrate the sourcing process with both Tier 1 and Tier 2 suppliers.

SUMMARY OF THE INVENTION

The present invention solves one or more problems of the prior art by providing in one embodiment a method by which a purchaser sources a group of parts together to a primary supplier that may in turn source one or more of the parts to a secondary supplier. The method of the invention is further characterized in that the purchaser retains the ability to direct the secondary supplier to the location to which the one or more parts are to be shipped. Typically this location will be a facility of the purchaser. The method of the invention advantageously reduces the supply base while maximizing the various functional benefits of doing business with one supplier in lieu of numerous suppliers.

In another embodiment of the invention, a computer system for purchasing parts from a secondary supplier is provided. The computer system of the invention implements the methods of the invention. In particular, the computer system comprises a computer network including one or more computers operably programmed and configured to execute the methods of the invention. During normal operation, a number of different classes of users will accessing the computer system of the invention. Moreover, a number of different methods of accessing the computer system of the invention may be used including both internet and intranet access.

DETAILED DESCRIPTION OF THE PREFERRED EMBODIMENT(S)

Reference will now be made in detail to presently preferred embodiments and methods of the invention, which constitute the best modes of practicing the invention presently known to the inventors.

The term "system integrator parts" refers to parts that are ordered from a supplier.

The term "commodity rollup part" as used herein refers to parts or components that are of the same type, and which are ordered in large quantities from a supplier.

The term "purchasing entity" as used herein refers to any business entity that orders part and components. A purchasing entity is typically a manufacturing company.

The term "primary supplier" as used herein refers to a supplier from which a business entity directly purchases parts or components. Typically, such suppliers are referred to as Tier 1 suppliers.

The term "secondary supplier" as used herein refers to a supplier from which a primary supplier purchases parts or components. Typically, such suppliers are referred to as Tier 2 suppliers when a Tier 1 supplier purchases parts. Similarly, Tier 3 and higher suppliers are also identified and known in the art.

The term "computer network" as used herein refers to a plurality of computers that are operably connected to allow communication between each computer in the plurality.

The definition of computer network includes arrangements of computers typically referred to in the art as intranets or the internet.

Figure 1:
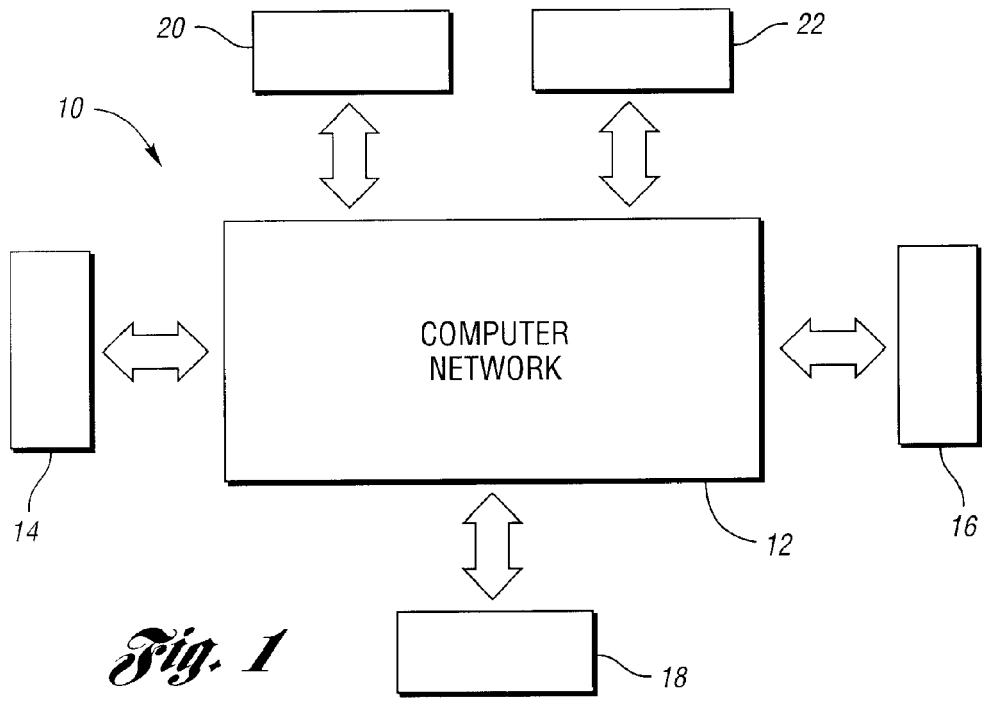
FIG. 1 is a schematic illustrating the interaction of users with a computer system executing the method of the invention.

In one embodiment of the present invention, a method of purchasing a part is provided. The method of the invention is executed by a computer system that includes a computer network having one or more computers. With reference to FIG. 1, a schematic illustrating the operation of a computer system executing the method of the invention is provided. In particular, FIG. 1 illustrates the interaction of various users with the computer system of the invention. Users of the system of this invention include, but are not limited to, employees of a purchasing entity authorized to initiate requests for a purchase, buyers employed by a purchasing entity, agents of supplies, accounts payable employees of the purchasing entity, and the like. Computer system 10 includes computer network 12 which includes one or more computers. Manufacturing activity 14 interacts with computer system 10 providing part volumes and information regarding which plants of the purchasing entity require which parts. Sourcing activity 16 interacts with computer system 10 to provide and analyze sourcing requirements to the system. Buyer activity 18 interacts with computer system 10 to generate a request for quotation and to review and approve quotations received from suppliers.

Figure 2:
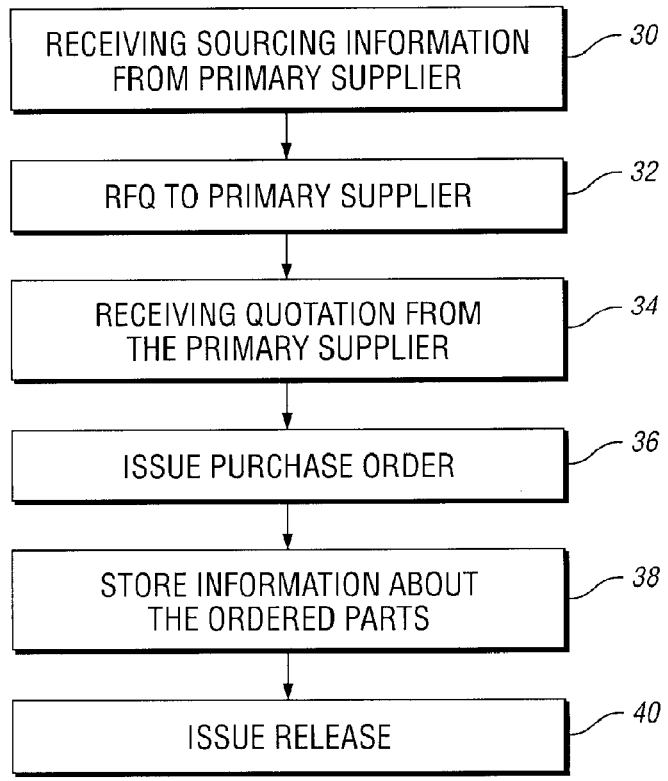
FIG. 2 is a flowchart outlining the steps of the method of the invention.

With reference to FIG. 2, a flowchart summarizing the method executed by computer system 10 is provided. In step 30, a purchasing entity obtains sourcing information from a primary supplier which identifies one or more secondary suppliers for one or more parts of a group of parts. Typically, the sourcing information is obtained over the computer network. In the automobile industry, such a primary supplier is often referred to as a Tier 1 supplier and such a secondary supplier is referred to as a Tier 2 supplier. The purchaser will subsequently place an order for the group of parts by ordering the part from the primary supplier. In the typical purchasing procedure, a request for quotation will be issued prior to the placement of an order (step 32). When such a request for quotation is made, it is advantageously transmitted to the primary supplier in electronic (i.e., digital format). Usually methods of soliciting the quotation include, e-mailing the supplier a request for quotation, posting the request on a computer system that is accessible by supplier, and the like. Such a posting can be achieved by posting the request on a website that is accessible to the supplier. Such websites are typically secured requiring a logon by the supplier since only authorized suppliers are allowed to provide quotations. Next, the purchasing entity receives a quotation from the primary supplier over the computer network (step 34). Upon approval of the quotation, a purchase order is issued in step 36 to the primary supplier. Typically, this purchase order will be transmitted from a computer on the computer network.

Still referring to FIG. 2, information about the ordered group of parts is stored on a storage medium for tracking purposes (step 38). Examples of such digital storage media include hard drives, optical drives, compact discs, DVDs, magnetic storage tapes, floppy drives, RAM memory, ROM memory and combinations thereof. Such data will include information that identifies the third party secondary supplier for a part or group of parts. In step 40, the purchasing entity than issues a release to the secondary supplier to ship the part to a location predetermined by the purchasing entity. Often, this location is a facility of the purchasing entity.

As set forth above, the method of the invention includes a step in which sourcing information is obtained from a primary supplier (step 30). Although the minimum amount of information needed is the identification one or more secondary suppliers for a part or component, additional information may be retrieved in this step. For example information about the relationship between each identified secondary supplier and the primary supplier may optionally be obtained. Such information includes for example historical information about the extent of the purchases made by the primary supplier and the secondary suppliers, the number of years the primary and secondary suppliers have conducted business together, information about other entities with which the secondary suppliers have conducted business, and the like. When considered in the context of a large manufacturing company, this information is voluminous. In order to provide and access such information in a useful form electronic storage media accessible by computer based data retrieval protocols are used. Therefore, typically, the sourcing information obtained from the primary supplier is electronically transmitted from the primary supplier to the purchaser in digital form. Any convenient method of transferring this information may be used. Examples include uploading digital information to a purchaser's microprocessor system by email, by filling in a form on a website, by a direct link, by a modem connection to the purchaser's microprocessor system, or combinations thereof. The purchaser's microprocessor system receives the information and stores it on a digital storage medium. Examples of such digital storage media include hard drives, optical drives, compact discs, DVDs, magnetic storage tapes, floppy drives, and combinations thereof.

The group of parts that are ordered in step 32 will typically fall into two categories—systems integrator parts and market based commodity roll-up parts. Systems integrator parts are related in terms of engineering, i.e., the parts fit together and therefore need to be designed as an interdependent group of parts. In contrast, commodity roll-up parts are based on different types of groupings. Specifically, parts that fall into this category are similar in manufacturing (i.e., plastic interior trim parts for an automobile interior) but not necessarily interdependent in terms of engineering design. Moreover, such parts may be in the same commodity group, and are accordingly grouped together for commercial reasons rather than for engineering design reasons. Accordingly, it is often more convenient to purchase such parts from a single supplier.

Figure 3A:
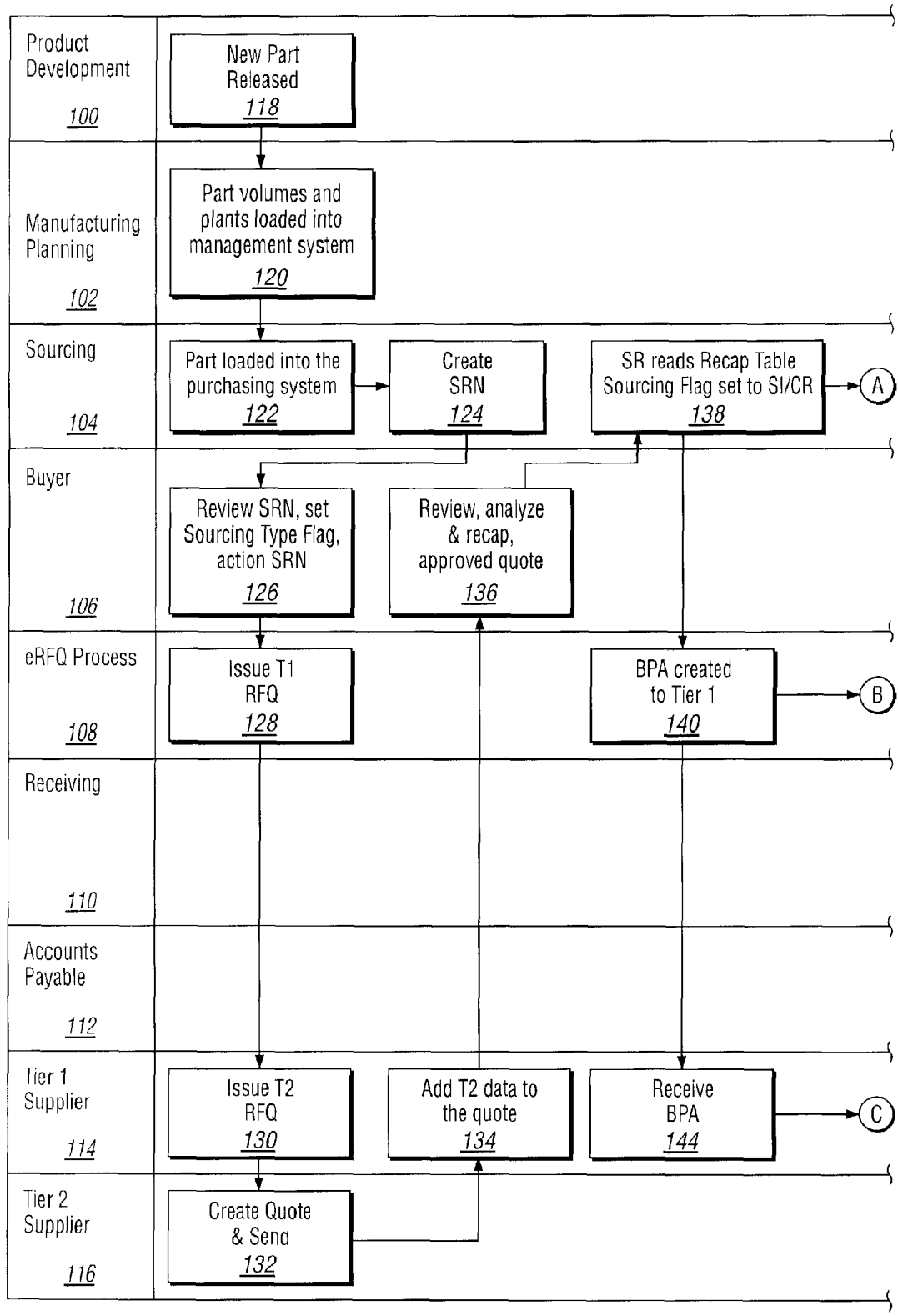
FIG. 3 is a flowchart which shows the integration of the method of the invention is a realistic purchasing system.
Figure 3B:
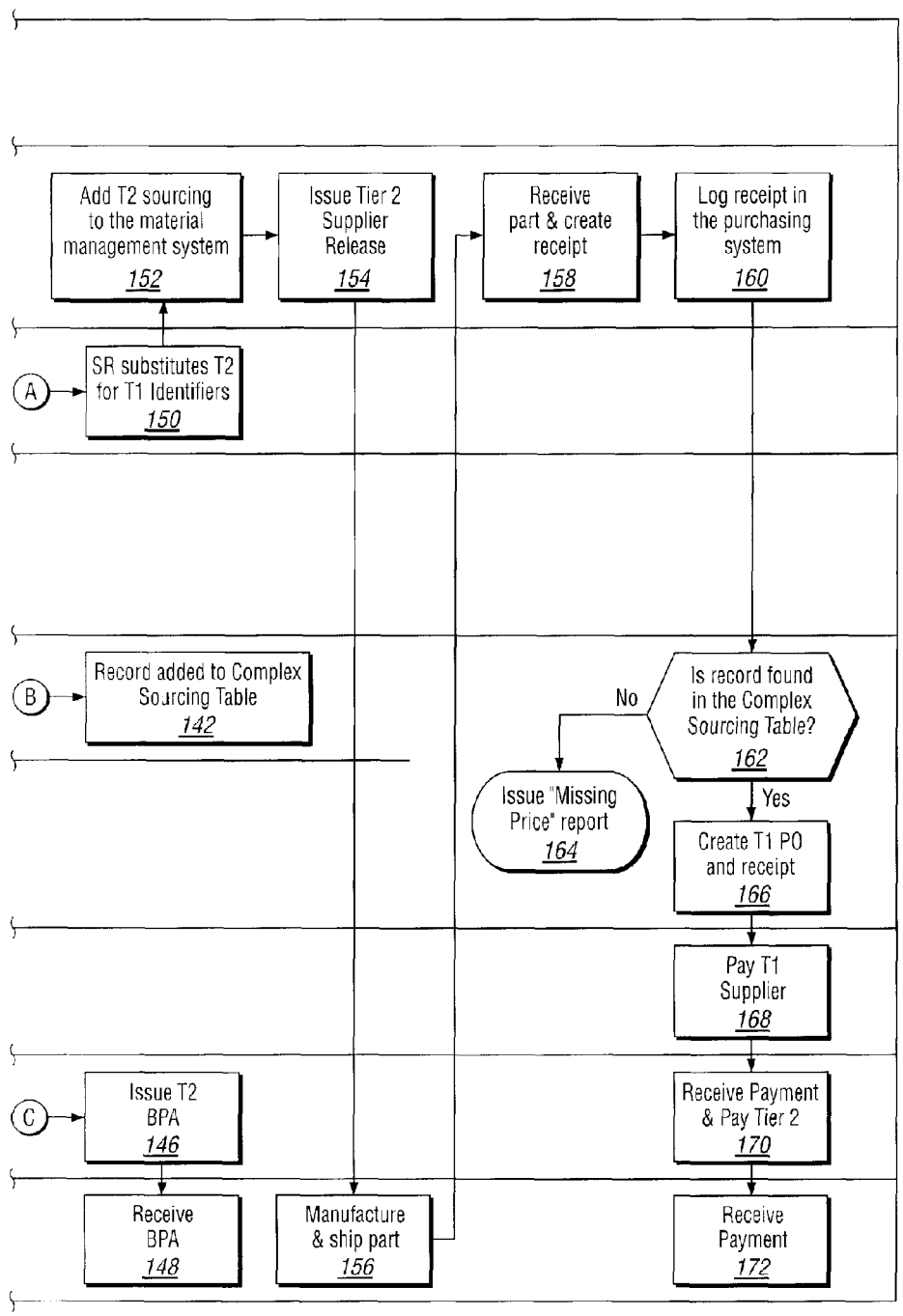

With reference to FIG. 3, a flowchart illustrating the integration of the direct shipping method of the invention into a complex (and more realistic) purchasing system is provided. It should be recognized that one or more steps of the method described by FIG. 3 are executed by a computer system. Such a computer system includes one or more computers that are programmed and configured to execute these steps. The methods of the invention require the integration of several layers of purchasing which in general are performed by different groups in a purchasing entity. In this example, the layers include product development layer 100, manufacturing planning layer 102, sourcing layer 104, buyer layer 106, electronic Request for Quotation process layer 108, receiving layer 110, accounts payable layer 112, Tier 1 supplier layer 114, and Tier 2 supplier layer 116. As used herein, a "purchasing entity" refers to any organization that purchases a part or a component from a supplier. FIG. 3 illustrates the complexity of the purchasing process in which variation groups in a purchasing entity must interact. In step 118, a new part is released for production by the product development group of a purchasing entity. Once such a part is released, assignment of the manufacture or assembly of the part to a company's plant is performed and an assessment of the projected part volumes is made in step 120. Typically, these steps are performed by a manufacturing planning group. Next, the part along with any subcomponents must be sourced as illustrated by the step which falls within the sourcing layer. First, in step 122 the part is loaded into the purchasing system. Once loaded, a sourcing requirements notification is generated in step 124 ("SRN"). The SRN provides a breakdown of every component of a part which needs to be supplied by a supplier. After the SRN is generated, a buyer reviews the SRN and sets a flag that identifies the type of sourcing to be performed (step 126). Examples of sourcing types are SI/CR, normal, and Direct sourcing. Moreover, the buyer will complete any other type of SRN action necessary to properly identify a supplier for a given part or component. After the SRN process is completed, the purchasing system enters the electronic Request for Quotation process ("eRFQ"). In step 128, an eRFR is made available to potential Tier 1 suppliers. In accordance to the method of the present invention, the ordered part includes one or more components that are to be supplied by a Tier 2 supplier (the secondary third party supplier). The Tier 1 supplier issues a Tier 2 RFQ for these one or more subcomponents in step 130. In response to the RFQ of step 130, the Tier 2 supplier generates a quote and sends it to the Tier 1 supplier in step 132. In step 134, the Tier 1 supplier includes the information from the Tier 2 quotation provided in step 132 in the quotation which the Tier 1 supplier will provide the buyer of the purchasing entity. The buyer reviews and analyzes the quotation and creates a recap (i.e., a summary) in step 136. Ultimately, in this step the suppliers that will be used are identified and the quotation is approved. The SRN process then reviews the recap and sets a flag that the part which is to be purchased is a system integrator/commodity rollup ("SI/CR") part (step 138). Upon the completion of step 138, a blanket purchase agreement (BPA) is generated by the eRFQ process (step 140) and a record associated with the part currently being ordered is added to a complex sourcing ("CS") table (step 142). The complex sourcing table is a spreadsheet that is used to track the suppliers used for each component of a part. In addition to tracking the suppliers used for each component of a part, this table indicates how a part is sourced ("CI/CR") or Direct Sourced) for a given period of time. The complex sourcing table will typically be in electronic or digital form, being accessible over a computer network. Examples of the form the complex sourcing table might exist in include, databases, spreadsheets, word processing files, text-based files, entries in a website, and the like. The Tier 1 supplier receives the Tier 1 supplier BPA (step 144) in response to which a Tier 2 supplier BPA is generated (step 146) and received by the Tier 2 supplier (step 148).

Still referring to FIG. 3, after step 138 within the sourcing layer, Tier 2 supplier identifies are substituted for Tier 1 supplier identifiers where appropriate as indicated by step 150. Next manufacturing planning adds this Tier 2 supplier information to the material management system in step 152. The material management system keeps track of the supplier for each component and coordinates the shipping and storage of parts and components to a specified facility or plant. At a preselected time, a release is issued to the Tier 2 supplier directly without going through the Tier 1 supplier (step 154). The Tier 2 supplier then manufactures the part and then ships the part in accordance with the instruction issued by the purchasing entity and to the location specified by the purchasing entity (step 156). The part is then received by the appropriate facility of the purchasing entity with a receipt generated as indicated in step 158. This receipt is then logged in the purchasing system (step 160).

Still referring to FIG. 3, after logging of the receipt in step 160 a determination is made as to whether or not there is a record of the purchase in the complex sourcing table (step 162). If such a record doesn't exist, a "missing price" report is issued (step 164). If the price information is available, a Tier 1 purchase order ("PO") and receipt is generated (step 166). Accounts payable then pays the Tier 1 supplier (step 168). In payment step 170, the Tier 1 supplying pays the Tier 2 supplier after receiving payment from the purchasing entity. Finally, the Tier 2 supplier receives the payment (step 172).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method by which a purchasing entity purchases a part or a system component, the method comprising:
    a) obtaining over a computer network sourcing information from a Tier 1 supplier, the Tier 1 supplier supplying at least one assembly to the purchasing entity, wherein the sourcing information identifies
        (1) at least one third party Tier 2 supplier, the Tier 2 supplier supplying at least one subcomponent to be integrated into the assembly; and
        (2) a pre-existing relationship between the Tier 1 supplier and the Tier 2 supplier;
    b) ordering the at least one assembly from the Tier 1 supplier, wherein the ordering results in a requisition to the Tier 2 supplier of the at least one subcomponent;
    c) storing data regarding the at least one assembly and the at least one subcomponent ordered in step b on a digital storage medium, wherein the data includes identifying information of the third party Tier 2 supplier; and
    d) bypassing the Tier 1 supplier and directly issuing a release to the Tier 2 supplier to ship the subcomponent to a predetermined location.

2. The method of claim 1 wherein the sourcing information further includes information about the relationship between the Tier 2 supplier and at least one business entity, other than the Tier 1 supplier, with whom the Tier 2 supplier has conducted business, and further comprising the Tier 1 supplier electronically transmitting the sourcing information to the purchaser.

3. The method of claim 1 wherein the sourcing information obtained from the Tier 1 supplier is electronically transmitted from the Tier 1 supplier to the purchaser.

4. The method of claim 3 wherein the digital information is uploaded to a purchaser's microprocessor system by email, by filling in a form on a website, by a direct link, by a modem connection to the purchaser's microprocessor system, or combinations thereof.

5. The method of claim 1 wherein the stored data regarding the at least one assembly and at least one subcomponent is stored on a digital storage medium.

6. The method of claim 5 wherein the digital storage medium is selected from the group consisting of hard drives, optical drives, RAM memory, ROM memory, compact discs, DVDs, magnetic storage tape, floppy drives, and combinations thereof.

7. The method of claim 1 wherein prior to ordering the at least one assembly in step (b), the purchaser issues a request for quotation to the Tier 1 supplier and further receives a quotation which includes a price from the Tier 2 supplier.

8. The method of claim 7 wherein the request for quotation is made available to the Tier 1 supplier in a digital format.

9. A method by which a purchasing entity purchases a part or a system component, the method comprising:
    a) obtaining over a computer network sourcing information from a Tier 1 supplier, the Tier 1 supplier supplying at least one assembly to the purchasing entity, wherein the sourcing information identifies
        (1) at least one third party Tier 2 supplier, the Tier 2 supplier supplying at least one subcomponent to be integrated into the assembly; and
        (2) a pre-existing relationship between the Tier 1 supplier and the Tier 2 supplier;

b) making a request for quotation available to the Tier 1 supplier over the computer network;
c) receiving a quotation from the Tier 1 supplier over the computer network, the quotation including a price from the Tier 2 supplier;
d) issuing a purchase order to the Tier 1 supplier;
e) storing data regarding the at least one assembly and the at least one subcomponent ordered in step d on a digital storage medium, wherein the data includes identifying information of the third party Tier 2 supplier; and
f) bypassing the Tier 1 supplier and directly issuing a release to the Tier 2 supplier to ship the subcomponent to a predetermined location.

10. The method of claim 9 wherein the sourcing information further includes information about the relationship between the Tier 2 supplier and at least one business entity, other than the Tier 1 supplier, with whom the Tier 2 supplier has conducted business, and further comprising the Tier 1 supplier electronically transmitting the sourcing information to the purchaser.

11. The method of claim 9 wherein the sourcing information obtained from the Tier 1 supplier is electronically transmitted from the Tier 1 supplier to the purchaser.

12. The method of claim 11 wherein the digital information is uploaded to a purchaser's microprocessor system by email, by filling in a form on a website, by a direct link, by a modem connection to the purchaser's microprocessor system, or combinations thereof.

13. The method of claim 9 wherein the stored data regarding the at least one assembly and at least one subcomponent is stored on a digital storage medium.

14. The method of claim 13 wherein the digital storage medium is selected from the group consisting of hard drives, optical drives, RAM memory, ROM memory, compact discs, DVDs, magnetic storage taped, floppy drives, and combinations thereof.

15. A computer system for integrating the purchasing of parts from a Tier 1 and Tier 2 supplier, the system comprising a computer network including one or more computers operably programmed and configured to:

a) receive sourcing information from a Tier 1 supplier, the Tier 1 supplier supplying at least one assembly to the purchasing entity, wherein the sourcing information identifies
 (1) at least one third party Tier 2 supplier, the Tier 2 supplier supplying at least one subcomponent to be integrated into the assembly; and
 (2) a pre-existing relationship between the Tier 1 supplier and the Tier 2 supplier;
b) order the at least one assembly from the Tier 1 supplier, wherein the order results in a requisition to the Tier 2 supplier of the at least one subcomponent;
c) store data regarding the at least one assembly and the at least one subcomponent ordered in step b on a storage medium, wherein the data includes identifying information of the third party Tier 2 supplier; and
d) bypass the Tier 1 supplier and directly issue a release to the Tier 2 supplier to ship the subcomponent to a predetermined location.

16. The computer system of claim 15 wherein the one or more computers are operably programmed and configured to order the at least one assembly by making a request for quotation available to the Tier 1 supplier over the computer network and receiving a quotation from the Tier 1 supplier over the computer network, the quotation including a price from the Tier 2 supplier.

17. The computer system of claim 15 wherein the sourcing information is uploaded to a purchaser's microprocessor system by email, by filling in a form on a website, by a direct link, by a modem connection to the purchaser's microprocessor system, or combinations thereof.

18. The computer system of claim 15 wherein the sourcing information is stored on a digital storage medium.

19. The computer system of claim 18 wherein the digital storage medium is selected from the group consisting of hard drives, optical drives, RAM memory, ROM memory, compact discs, DVDs, magnetic storage taped, floppy drives, and combinations thereof.

* * * * *